US011944983B2

(12) United States Patent
Ihara et al.

(10) Patent No.: US 11,944,983 B2
(45) Date of Patent: Apr. 2, 2024

(54) ELECTROSTATIC SEPARATOR AND ELECTROSTATIC SEPARATION METHOD

(71) Applicant: KAWASAKI JUKOGYO KABUSHIKI KAISHA, Kobe (JP)

(72) Inventors: Takayuki Ihara, Kobe (JP); Koki Ikeda, Kobe (JP); Naoya Ogiyama, Kobe (JP); Yusuke Iida, Kobe (JP); Manabu Masamoto, Kobe (JP); Koji Fukumoto, Kobe (JP); Gen Kiyotaki, Kobe (JP); Keiichi Mashio, Kobe (JP); Tomoyuki Suzuki, Kobe (JP); Ryoma Yamamoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/033,480

(22) PCT Filed: Oct. 19, 2021

(86) PCT No.: PCT/JP2021/038541
§ 371 (c)(1),
(2) Date: Apr. 24, 2023

(87) PCT Pub. No.: WO2022/085665
PCT Pub. Date: Apr. 28, 2022

(65) Prior Publication Data

US 2023/0398553 A1 Dec. 14, 2023

(30) Foreign Application Priority Data

Oct. 23, 2020 (WO) .................. PCT/JP2020/039915

(51) Int. Cl.
*B03C 7/08* (2006.01)
*B03C 7/02* (2006.01)
*B03C 7/00* (2006.01)

(52) U.S. Cl.
CPC .................. *B03C 7/08* (2013.01); *B03C 7/02* (2013.01); *B03C 7/00* (2013.01)

(58) Field of Classification Search
CPC ................ B03C 7/00; B03C 7/02; B03C 7/08
See application file for complete search history.

(56) References Cited

U.S. PATENT DOCUMENTS 3,402,814 A 9/1968 Marius et al.
5,375,721 A * 12/1994 LaVigne .................. B03B 4/04 209/131

(Continued)

FOREIGN PATENT DOCUMENTS

JP 2003-126832 A 5/2003
JP 2006-015298 A 1/2006

(Continued)

*Primary Examiner* — Michael McCullough
*Assistant Examiner* — Kalyanavenkateshware Kumar
(74) *Attorney, Agent, or Firm* — Oliff PLC

(57) ABSTRACT

An electrostatic separation method includes: applying voltage between a lower electrode at a bottom portion of or in the raw material layer and an upper electrode above the raw material layer, generating an electric field between electrodes; fluidizing the raw material layer and bringing conductive particles and the lower electrode into contact in the raw material layer charging only the conductive particles wherein their polarity becomes the same as the lower electrode; generating polarity, the same as the upper electrode, by dielectric polarization on a conveyor belt downward-facing conveyance surface passing through a capture region above the raw material layer and under the upper electrode, the conveyance surface including a nonconductor; separates charged conductive particles from the raw material layer surface by electrostatic force and adhering conductive particles to the conveyor belt conveyance surface; and separating and collecting the particles from the conveyance surface that moved outside the electric field.

12 Claims, 8 Drawing Sheets

(56) References Cited

U.S. PATENT DOCUMENTS

| | | | |
|---|---|---|---|
| 7,119,298 | B2 | 10/2006 | Yoshiyama et al. |
| 2004/0035758 | A1 | 2/2004 | Yoshiyama et al. |

FOREIGN PATENT DOCUMENTS

| | | | | |
|---|---|---|---|---|
| JP | 3981014 B2 | 9/2007 | | |
| JP | 2015-160190 A | 9/2015 | | |
| WO | 2002/076620 A1 | 10/2002 | | |
| WO | WO-2010104409 A1 * | 9/2010 | ............... | B03C 7/06 |

* cited by examiner

ELECTROSTATIC SEPARATOR AND ELECTROSTATIC SEPARATION METHOD

CROSS-REFERENCE TO RELATED APPLICATIONS

This is a National Phase of International Application No. PCT/JP2021/038541 filed Oct. 19, 2021, which claims priority to International Application No. PCT/JP2020/039915 filed Oct. 23, 2020. The disclosure of the prior applications is hereby incorporated by reference herein in its entirety.

TECHNICAL FIELD

The present disclosure relates to an electrostatic separator and an electrostatic separation method, each of which separates conductive particles from raw materials including the conductive particles and insulating particles.

BACKGROUND ART

Electrostatic separators that separate conductive particles by electrostatic force from raw materials including the conductive particles and insulating particles (nonconductive particles) have been known. Such electrostatic separators may be utilized to separate specific components from coal ash or waste (such as waste plastic, garbage, or incineration ash), remove impurities of food, concentrate minerals, and the like. PTL 1 discloses this type of electrostatic separator.

The electrostatic separator disclosed in PTL 1 includes: a flat plate-shaped bottom electrode; and a flat plate-shaped mesh electrode located above the bottom electrode and including a large number of opening portions. A voltage is applied between these electrodes, and this generates a separation zone between these electrodes by electrostatic force. Moreover, the bottom electrode is constituted by a gas dispersion plate having gas permeability, and a dispersion gas is introduced to the separation zone from a lower side of the gas dispersion plate. Vibration is applied to at least one of the bottom electrode or the mesh electrode. With this, the conductive particles in the raw materials supplied to the separation zone pass through the opening portions of the mesh electrode to be separated above the separation zone. The conductive particles separated above the separation zone are conveyed by gas flow to a dust collector through a suction pipe and are collected by the dust collector.

CITATION LIST

Patent Literature

PTL 1: Japanese Patent No. 3981014

SUMMARY OF INVENTION

Technical Problem

Coal ash in thermal power plants contains unburned carbon (conductive particles) and ash (insulating particles). The coal ash from which the unburned carbon has been removed is valuable as high-quality coal ash. Therefore, to reduce the amount of unburned carbon contained in the coal ash, it is desirable to separate the unburned carbon from the coal ash.

In the electrostatic separator of PTL 1, in some cases, the conductive particles flying out toward above the separation zone are accompanied by the insulating particles. The insulating particles that have flown out are conveyed by gas flow together with the conductive particles to the dust collector and are collected. Due to these circumstances, there is still room for improvement regarding the purity of the conductive particles in particulates collected by the dust collector.

The present disclosure was made under these circumstances, and an object of the present disclosure is to, in an electrostatic separator that separates conductive particles from raw materials including the conductive particles and insulating particles, improve the purity of particulates including the collected conductive particles.

Solution to Problem

An electrostatic separator according to one aspect of the present disclosure is an electrostatic separator that separates conductive particles from raw materials including the conductive particles and non-charged insulating particles.

The electrostatic separator includes: a container in which a raw material layer including the raw materials is located; a lower electrode located at a bottom portion of the raw material layer or in the raw material layer; a fluidization gas supplier that supplies a fluidization gas that is introduced from a bottom portion of the container into the raw material layer and flows upward in the raw material layer through the lower electrode; an upper electrode located above the raw material layer; an endless conveyor belt that includes a conveyance surface including a nonconductor and rotates such that the conveyance surface facing downward passes through a capture region that is located above the raw material layer and under the upper electrode; and a power supply that applies a voltage between the upper electrode and the lower electrode such that one of the upper electrode and the lower electrode becomes a negative electrode, the other becomes a positive electrode, and an electric field is generated between these electrodes. By bringing the conductive particles and the lower electrode into contact with each other in the raw material layer, only the conductive particles are charged to have polarity that is the same as polarity of the lower electrode. By dielectric polarization, polarity that is the same as polarity of the upper electrode is generated on the downward-facing conveyance surface of the conveyor belt which passes through the capture region. The charged conductive particles are selectively separated from the raw material layer by electrostatic force and are made to adhere to the conveyance surface of the conveyor belt. The conductive particles are separated and collected from the conveyance surface that has moved to an outside of the electric field.

Moreover, an electrostatic separation method according to another aspect of the present disclosure is an electrostatic separation method that separates conductive particles from raw materials including the conductive particles and non-charged insulating particles. The electrostatic separation method includes: applying a voltage between a lower electrode located at a bottom portion of a raw material layer including the raw materials or in the raw material layer and an upper electrode located above the raw material layer, to generate an electric field between these electrodes; fluidizing the raw material layer and bringing the conductive particles and the lower electrode into contact with each other in the raw material layer to charge only the conductive particles such that polarity of the conductive particles becomes the same as polarity of the lower electrode; generating polarity, which is the same as polarity of the upper electrode, by dielectric polarization on a downward-facing conveyance surface of a conveyor belt which passes through a capture region that is located above the raw material layer and under the upper electrode, the downward-facing conveyance surface including a nonconductor; selectively separating the charged conductive particles from a surface of the raw material layer by electrostatic force and making the conductive particles adhere to the conveyance surface of the conveyor belt; and separating and collecting the conductive particles from the conveyance surface that has moved to an outside of the electric field.

Advantageous Effects of Invention

The present disclosure can improve the purity of particulates including collected conductive particles in an electrostatic separator that separates the conductive particles from raw materials including the conductive particles and insulating particles.

DESCRIPTION OF EMBODIMENTS

Figure 1:
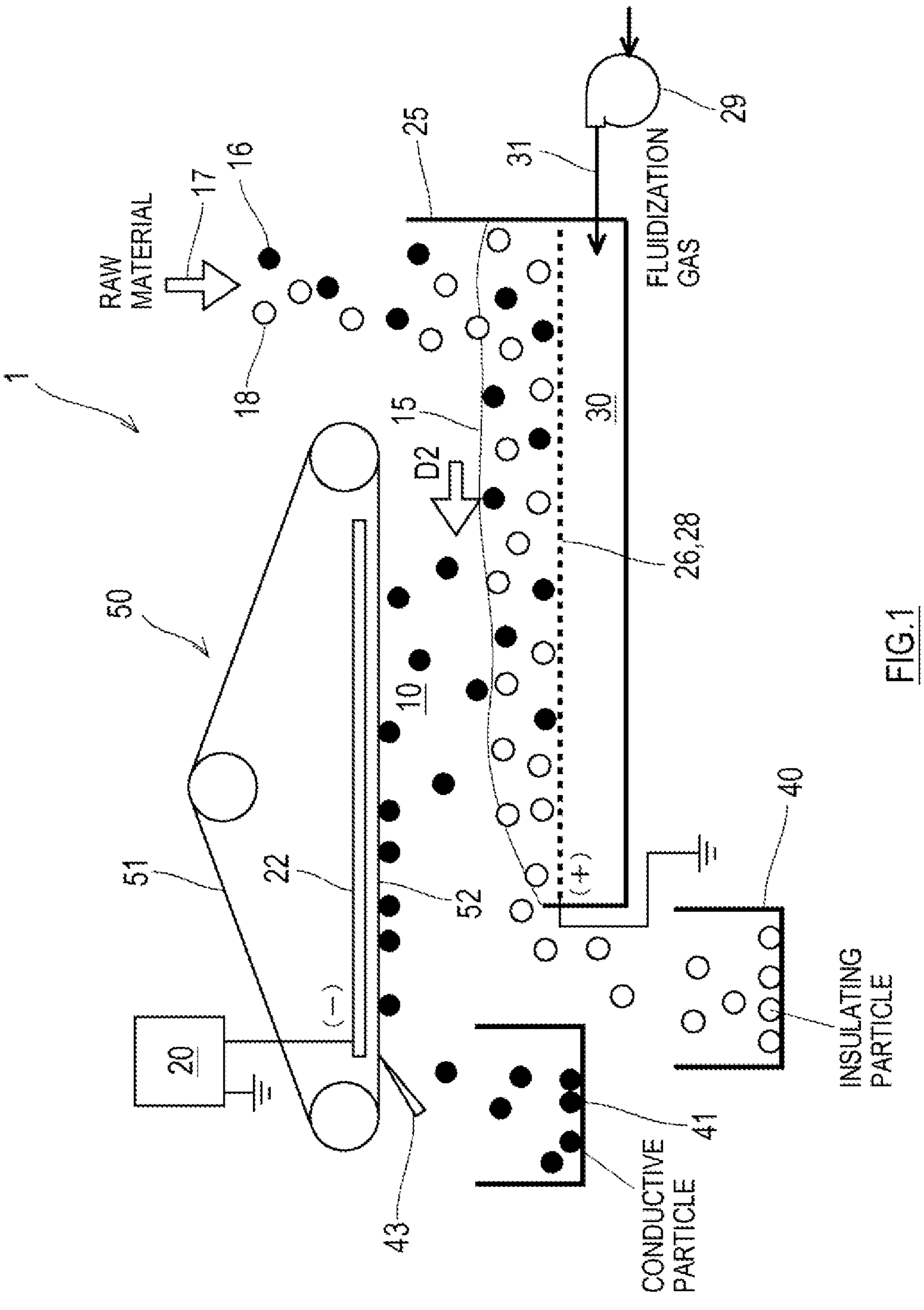
FIG. 1 is a diagram showing an entire configuration of an electrostatic separator according to one embodiment of the present disclosure.

Next, an electrostatic separator 1 according to an embodiment of the present disclosure will be described with reference to FIG. 1. FIG. 1 is a diagram showing an entire configuration of the electrostatic separator 1 according to the embodiment of the present disclosure. The electrostatic separator 1 according to the present embodiment mainly separates conductive particles 16 from raw materials 17 including the conductive particles 16 and insulating particles 18. For example, the electrostatic separator 1 may be used to separate unburned carbon (conductive particles 16) from coal ash (raw materials 17) including the unburned carbon (conductive particles 16) and ash (insulating particles 18). However, the use of the electrostatic separator 1 is not limited to this. The electrostatic separator 1 may be used to separate various particles or powder. The electrostatic separator 1 may be used to separate materials that are different in electrical conductivity or charging property from each other, for example, separate metal from waste, remove impurities from mercury, mineral, or food, etc.

As shown in FIG. 1, the electrostatic separator 1 according to the present embodiment includes: a container 25 in which a raw material layer 15 is located; a lower electrode 28 located at a bottom portion of the raw material layer 15 or in the raw material layer 15; an upper electrode 22 located above the raw material layer 15; a fluidization gas supplier 29 that fluidizes the raw material layer 15; conveyor equipment 50; and a power supply 20.

A gas dispersion structure 26 including a large number of minute holes is located at a bottom portion of the container 25. The gas dispersion structure 26 may be a porous plate (i.e., a gas dispersion plate) or a porous sheet. The raw materials 17 including the conductive particles 16 and the insulating particles 18 are supplied to the container 25 by a supplier (not shown). The raw material layer 15 is formed by the raw materials 17 accumulated on the lower electrode 28 in the container 25.

When the raw materials 17 are continuously or intermittently supplied to a first side of the container 25, the raw materials 17 gradually move from the first side of the container 25 toward a second side opposite to the first side. An insulating particle collecting container 40 that collects the particles (mainly the insulating particles 18) that have overflowed from the container 25 is located at the second side of the container 25.

A wind box 30 is located under the container 25. A fluidization gas 31 is supplied from the fluidization gas supplier 29 to the wind box 30. The fluidization gas 31 may be, for example, air. It is desirable that the fluidization gas 31 be a dehumidified gas (for example, a dehumidified gas having a dew point of 0° C. or lower). The fluidization gas 31 is introduced from the bottom portion of the container 25 into the raw material layer 15 and flows upward in the raw material layer 15 while flowing through the gas dispersion plate 26 and the lower electrode 28. The raw material layer 15 is fluidized by this fluidization gas 31.

In the present embodiment, a gas dispersion plate made of metal is adopted as the gas dispersion structure 26, and the gas dispersion plate serves as both the gas dispersion structure 26 and the lower electrode 28. However, the lower electrode 28 may be located in the raw material layer 15 and above the gas dispersion structure 26. In this case, the lower electrode 28 includes a mesh plate through which the fluidization gas 31 is allowed to pass, and a porous sheet made of resin, metal, or ceramics is adopted as the gas dispersion structure 26.

Figure 2:
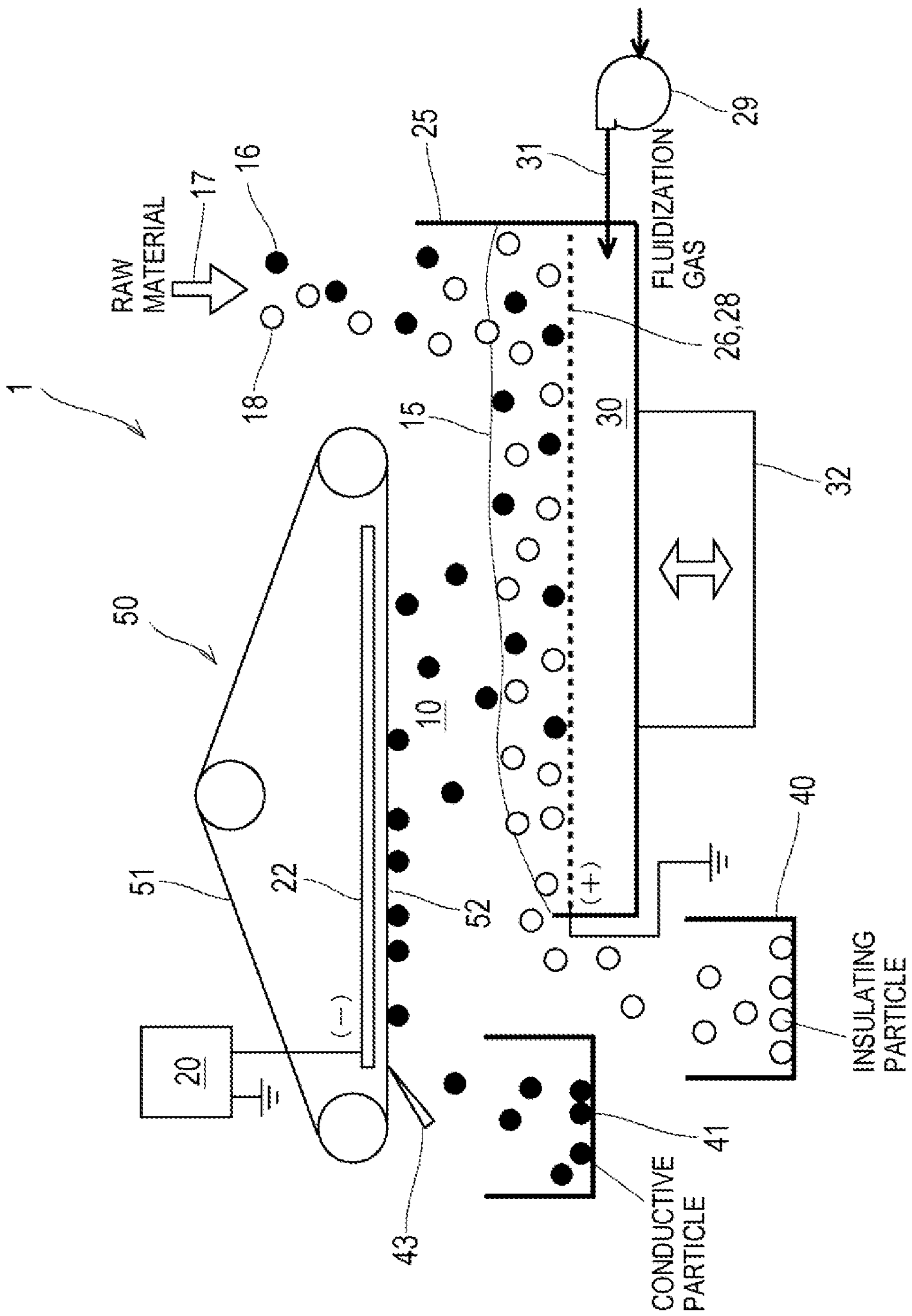
FIG. 2 is a diagram showing a modified example of the electrostatic separator including a container vibrator.

FIG. 2 is a diagram showing a modified example of the electrostatic separator 1 including a container vibrator 32. As shown in FIG. 2, the electrostatic separator 1 may further include the container vibrator 32 that vibrates the container 25. When the container 25 vibrates, the lower electrode 28 that is fixed to the container 25 and behaves integrally with the container vibrates. By the application of the vibration of the container vibrator 32, the container 25 (and the lower electrode 28) may vibrate in any one of an upper-lower direction and a horizontal direction or in a direction that is a combination of two or more directions. This vibration may be a reciprocating movement or a circular movement.

Referring back to FIG. 1, the conveyor equipment 50 includes an endless conveyor belt 51 and a rotary driver (not shown) for the conveyor belt 51.

Figure 3:
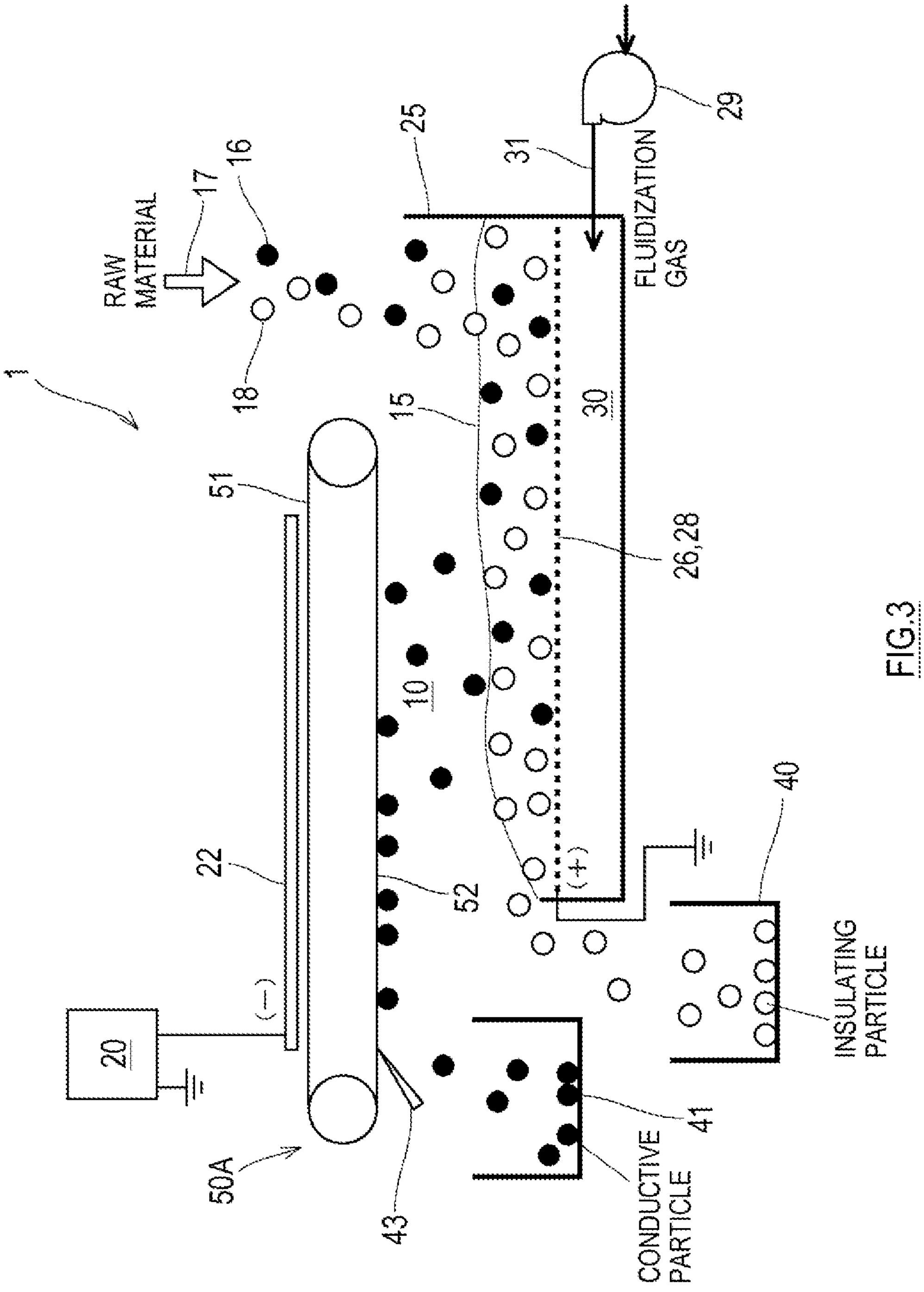
FIG. 3 is a diagram showing a modified example of the electrostatic separator in which an upper electrode is located outside a loop of a conveyor belt.

In the electrostatic separator 1 shown in FIG. 1, the upper electrode 22 is located inside a loop of the conveyor belt 51. However, as shown in FIG. 3, the upper electrode 22 may be located outside the loop of the conveyor belt 51. An outside surface of the loop of the conveyor belt 51 is a conveyance surface 52. A “capture region 10” is defined as a region located above the raw material layer 15 and under the upper electrode 22. The conveyor belt 51 that is rotating passes through the capture region 10 in such a posture that the conveyance surface 52 faces downward. The conveyance surface 52 of the conveyor belt 51 passing through the capture region 10 may be substantially horizontal.

Figure 4:
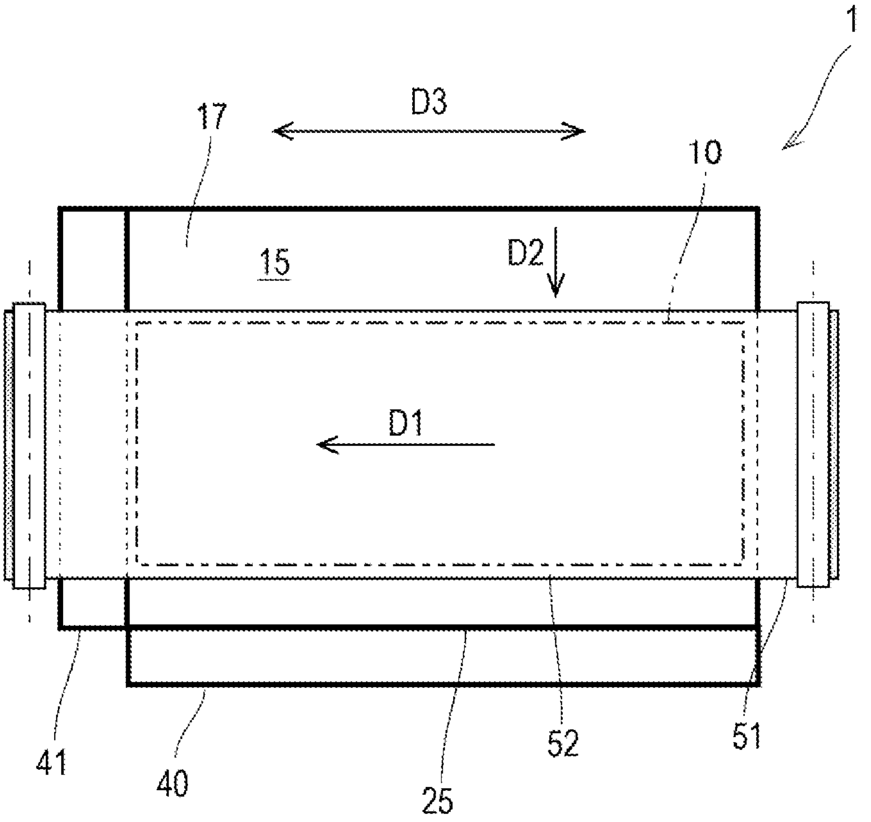
FIG. 4 is a plan view showing a relation between a movement direction of a conveyance surface of the conveyor belt and a flow direction of raw materials.

FIG. 4 is a plan view showing a relation between a movement direction D1 of the conveyance surface 52 of the conveyor belt 51 and a flow direction D2 of the raw materials 17. As shown in FIG. 4, the movement direction D1 of the conveyance surface 52 of the conveyor belt 51 passing through the capture region 10, i.e., the movement direction of the conductive particles 16 adhering to the conveyance surface 52 and the flow direction D2 of the raw materials 17 in the container 25 (raw material layer 15) are substantially orthogonal to each other in a plan view. To process a larger amount of raw materials 17 at once, it is desirable to increase a dimension of the container 25 in a width direction D3 orthogonal to the flow direction D2. In FIGS. 1 to 3 and 5, the movement direction D1 and the flow direction D2 are parallel to each other. However, the relation between the movement direction D1 and the flow direction D2 is not limited to those shown in the drawings.

As described above, the raw materials 17 in the container 25 gradually move in the flow direction D2 from the first side of the container 25 toward the second side. When the raw materials 17 in the container 25 approach the capture region 10, the conductive particles 16 are charged and adhere to the conveyance surface 52 of the conveyor belt 51. Therefore, the amount of conductive particles 16 to be charged gradually decreases from an upstream side to a downstream side in the flow direction D2. The conductive particles 16 adhering to the conveyance surface 52 of the conveyor belt 51 occupy the conveyance surface 52 until the conductive particles 16 are removed by a particle separation structure 43. Therefore, further adhering of the conductive particles 16 is inhibited. On this account, when the movement direction D1 and the flow direction D2 are orthogonal to each other, the conductive particles 16 can be made to adhere to and be collected by the conveyance surface 52 more efficiently than when the movement direction D1 and the flow direction D2 are parallel to each other. If the movement direction D1 of the conveyance surface 52 of the conveyor belt 51 passing through the capture region 10 and the flow direction D2 are parallel to each other, the width of the conveyor belt 51 increases. As above, to suppress the width of the conveyor belt 51, it is desirable that the movement direction D1 and the flow direction D2 be orthogonal to each other in a plan view. However, the movement direction D1 and the flow direction D2 may be parallel to each other.

In the conveyor belt 51, at least the conveyance surface 52 is a nonconductor. To be specific, portions of the conveyor belt 51 other than the conveyance surface 52 are not limited to a nonconductor. For example, the entire conveyor belt 51 may be a nonconductor. Moreover, for example, the conveyor belt 51 may be a steel cord conveyor belt including a steel cord therein. When the steel cord conveyor belt is adopted, the steel cord is exposed from an inner peripheral surface of the conveyor belt 51 and is connected to the power supply 20. With this, the steel cord can serve as the upper electrode 22.

The conveyor equipment 50 includes the particle separation structure 43. A conductive particle collecting container 41 is located under the particle separation structure 43. The particle separation structure 43 is, for example, a spatula-shaped structure (scraper) and can scrape the particles adhering to the conveyor belt 51. However, the particle separation structure 43 may be a structure (for example, an anti-static brush) having a destaticizing function and may destaticize the particles adhering to the conveyor belt 51 to separate the particles from the conveyor belt 51.

Figure 5:
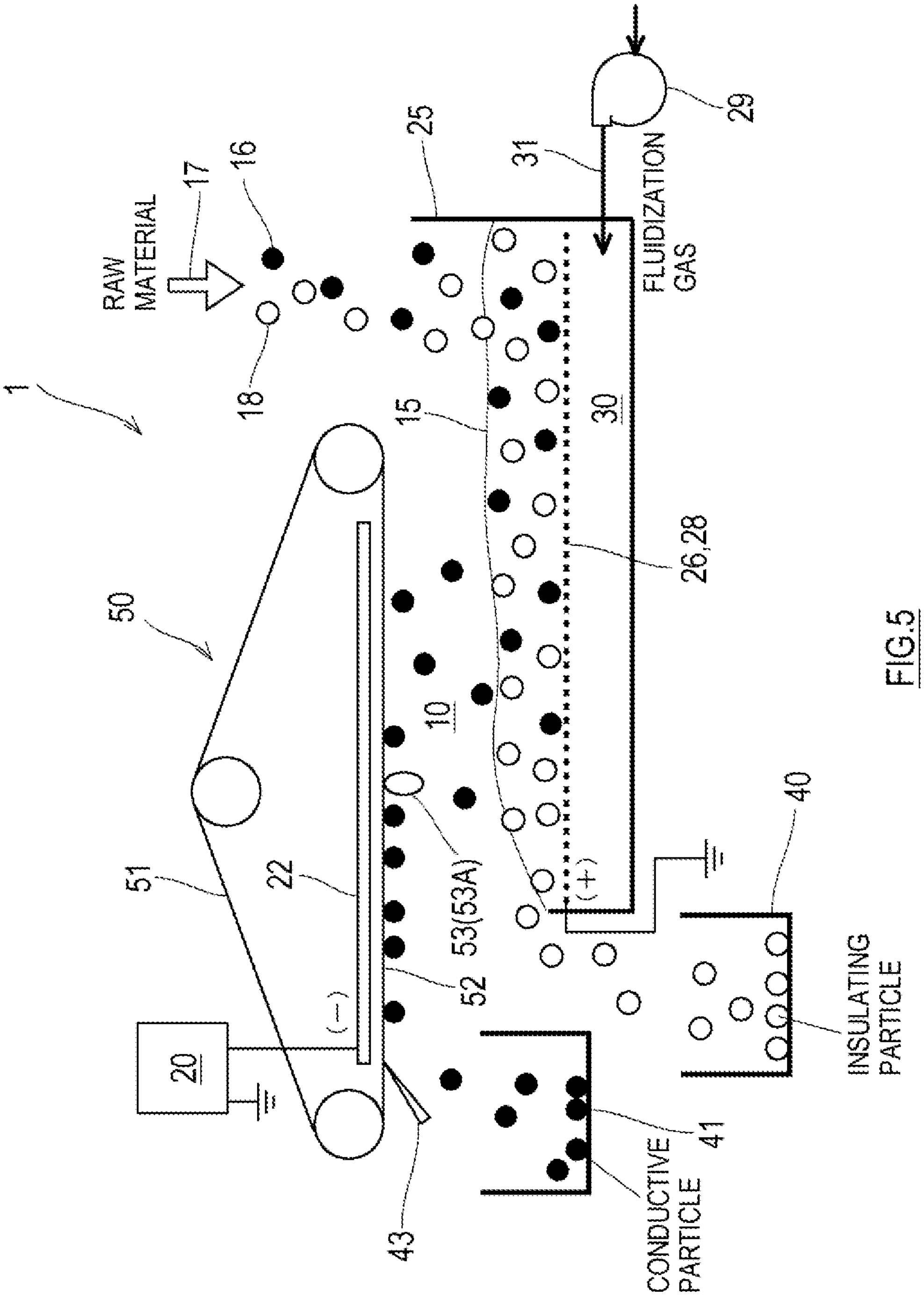
FIG. 5 is a diagram showing a modified example of the electrostatic separator including an insulating particle separation promoter of a belt vibration type.
Figure 6:
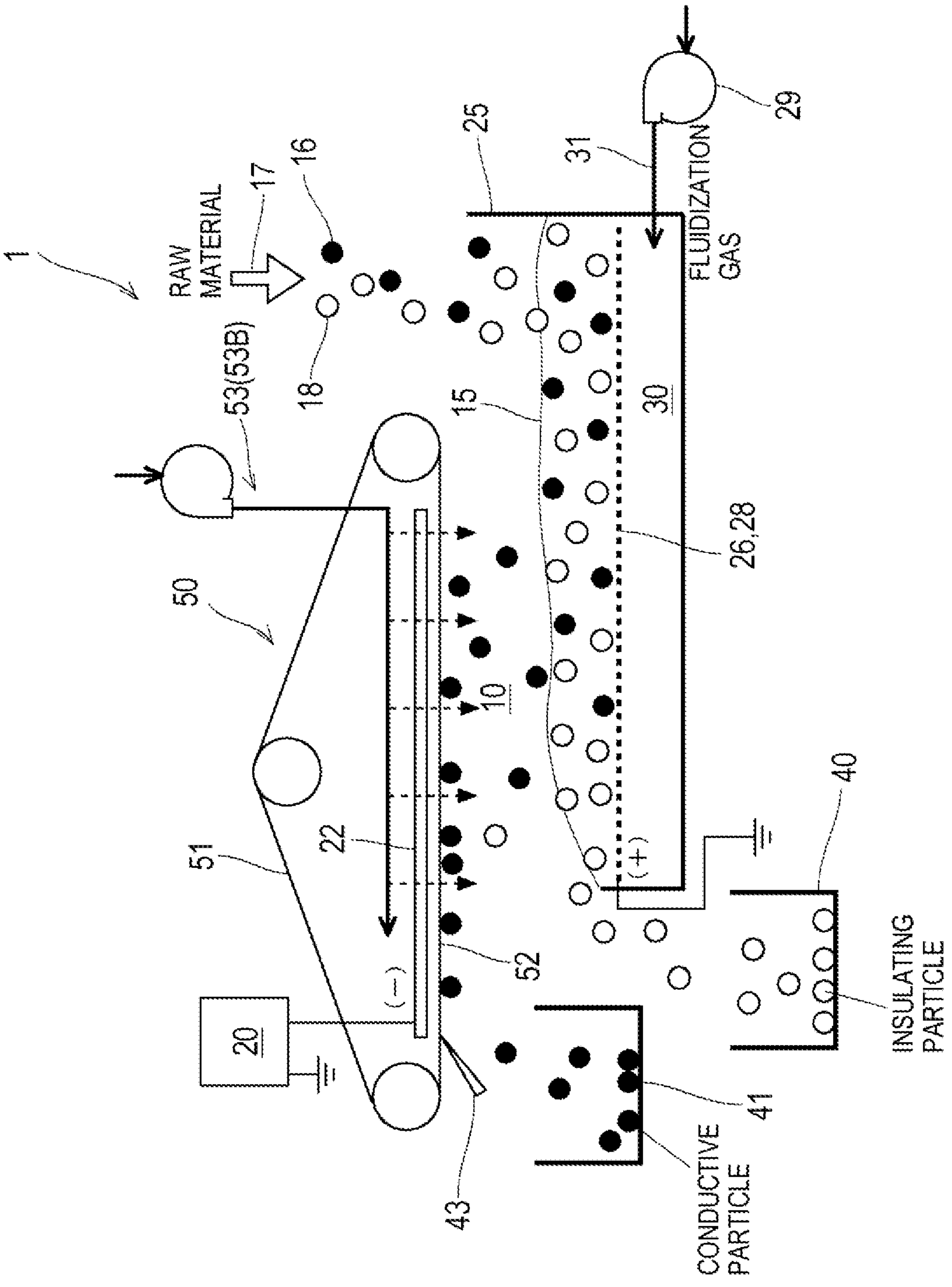
FIG. 6 is a diagram showing a modified example of the electrostatic separator including the insulating particle separation promoter of a gas permeable type.

FIGS. 5 and 6 are diagrams each showing a modified example of the electrostatic separator 1 including an insulating particle separation promoter 53. As shown in FIGS. 5 and 6, the electrostatic separator 1 may include the insulating particle separation promoter 53 (53A, 53B) that promotes the separation of the insulating particles 18 adhering to the conveyance surface 52 of the conveyor belt 51 or the conductive particles 16 by intermolecular force.

The insulating particle separation promoter 53A shown in FIG. 5 is of a belt vibration type. The insulating particle separation promoter 53A shakes the conveyance surface 52 by contacting the downward-facing conveyance surface 52 of the conveyor belt 51 and applying rotational vibration generated by the rotation of a motor. By the vibration of the conveyor belt 51, the insulating particles 18 are shaken off from the conveyance surface 52 of the conveyor belt 51 or the conductive particles 16. However, the location of the insulating particle separation promoter 53A is not limited to the present embodiment. The insulating particle separation promoter 53A may be located above the conveyance surface 52 (i.e., inside the loop of the conveyor belt 51) so as to contact a surface of the conveyor belt 51 which is opposite to the conveyance surface 52. Moreover, the insulating particle separation promoter 53A may apply vibration to the conveyor belt 51 by intermittently spraying compressed air.

The insulating particle separation promoter 53B shown in FIG. 6 is of a gas permeable type. The conveyor belt 51 is made of a material through which the conductive particles 16 and the insulating particles 18 cannot pass but gas can pass, and the insulating particle separation promoter 53B supplies a small amount of gas in a direction from the inside of the conveyor belt 51 toward the capture region 10. The insulating particle separation promoter 53B sprays gas, the amount of which is such a small amount that the insulating particles 18 separate from the conveyance surface 52 of the conveyor belt 51 or the conductive particles 16 by the intermolecular force, in a direction from the inside of the conveyor belt 51 toward the capture region 10. By the flow of the gas, the insulating particles 18 are blown off from the conveyance surface 52 of the conveyor belt 51 or the conductive particles 16.

Referring back to FIG. 1, the power supply 20 applies a voltage between the upper electrode 22 and the lower electrode 28 facing in the upper-lower direction. With this, one of the upper electrode 22 and the lower electrode 28 becomes a negative (−) electrode, and the other becomes a positive (+) electrode. Thus, an electric field is generated between these electrodes. In the present embodiment, a negative potential is applied to the upper electrode 22 by the power supply 20, and the lower electrode 28 is grounded such that the upper electrode 22 becomes the negative electrode, and the lower electrode 28 becomes the positive electrode. As one example, when an interval between the upper electrode 22 and the lower electrode 28 is several tens of millimeters to several hundreds of millimeters, an absolute value of the strength of the electric field generated between the upper electrode 22 and the lower electrode 28 may be about 0.1 to 1.5 kV/mm.

Electrostatic Separation Method

Herein, an electrostatic separation method performed by using the electrostatic separator 1 configured as above will be described.

In the electrostatic separator 1 shown in FIG. 1, dielectric polarization occurs at the conveyor belt 51 that is the nonconductor (insulator, derivative) by the electric field generated between the upper electrode 22 and the lower electrode 28, and a negative or positive (same as the polarity of the upper electrode 22) electric charge is generated on the downward-facing conveyance surface 52, passing through the capture region 10, of the conveyor belt 51. In the present embodiment, since the upper electrode 22 is the negative electrode, the negative electric charge is generated on the conveyance surface 52.

The raw material layer 15 in the container 25 is fluidized by the fluidization gas 31, and the flow of the raw materials 17 in the upper direction and the flow of the raw materials 17 in the lower direction are generated in the raw material layer 15. To be specific, the raw material layer 15 is being stirred. The conductive particles 16 that have contacted the lower electrode 28 by this stirring are charged positively or negatively (same as the polarity of the lower electrode 28). In the present embodiment, since the lower electrode 28 is the positive electrode, the conductive particles 16 are charged positively. The insulating particles 18 (nonconductor) are not charged even when the insulating particles 18 contact the lower electrode 28.

The charged conductive particles 16 move to a surface layer portion of the raw material layer 15 by the flow of the raw materials 17, are attracted to the downward-facing conveyance surface 52 of the conveyor belt 51 by the electrostatic force, fly out of the raw material layer 15, and adhere to the downward-facing conveyance surface 52. Since the conductive particles 16 do not directly contact the upper electrode 22, the charged state of the conductive particles 16 is maintained, and the conductive particles 16 keep on being attracted to the downward-facing conveyance surface 52 of the conveyor belt 51.

The conductive particles 16 adhering to the conveyance surface 52 of the conveyor belt 51 as above are carried by the rotation of the conveyor belt 51 to an outside of the electric field. Then, the conductive particles 16 are peeled off from the conveyance surface 52 of the conveyor belt 51 by the particle separation structure 43 at the outside of the electric field and are collected in the conductive particle collecting container 41.

On the other hand, since the insulating particles 18 in the raw material layer 15 are not charged, the insulating particles 18 are not attracted to the downward-facing conveyance surface 52 of the conveyor belt 51 by static electricity and stay in the raw material layer 15. As the raw materials 17 supplied to the container 25 move from the first side toward the second side in the container 25, a ratio of the conductive particles 16 in the raw materials 17 decreases, and a ratio of the insulating particles 18 in the raw materials 17 increases. The raw materials 17 which have overflowed from the container 25 and in which the ratio of the insulating particles 18 is high are collected in the insulating particle collecting container 40 located at the second side of the container 25.

In the electrostatic separator 1 and the electrostatic separation method, in some cases, the conductive particles 16 flying in the capture region 10 flows to a rear side of the conveyance surface 52 without adhering to the conveyance surface 52 of the conveyor equipment 50. To prevent the particles from flowing to the rear side of the conveyance surface 52, the conveyor equipment 50 may include pressurizing equipment 60.

Figure 7:
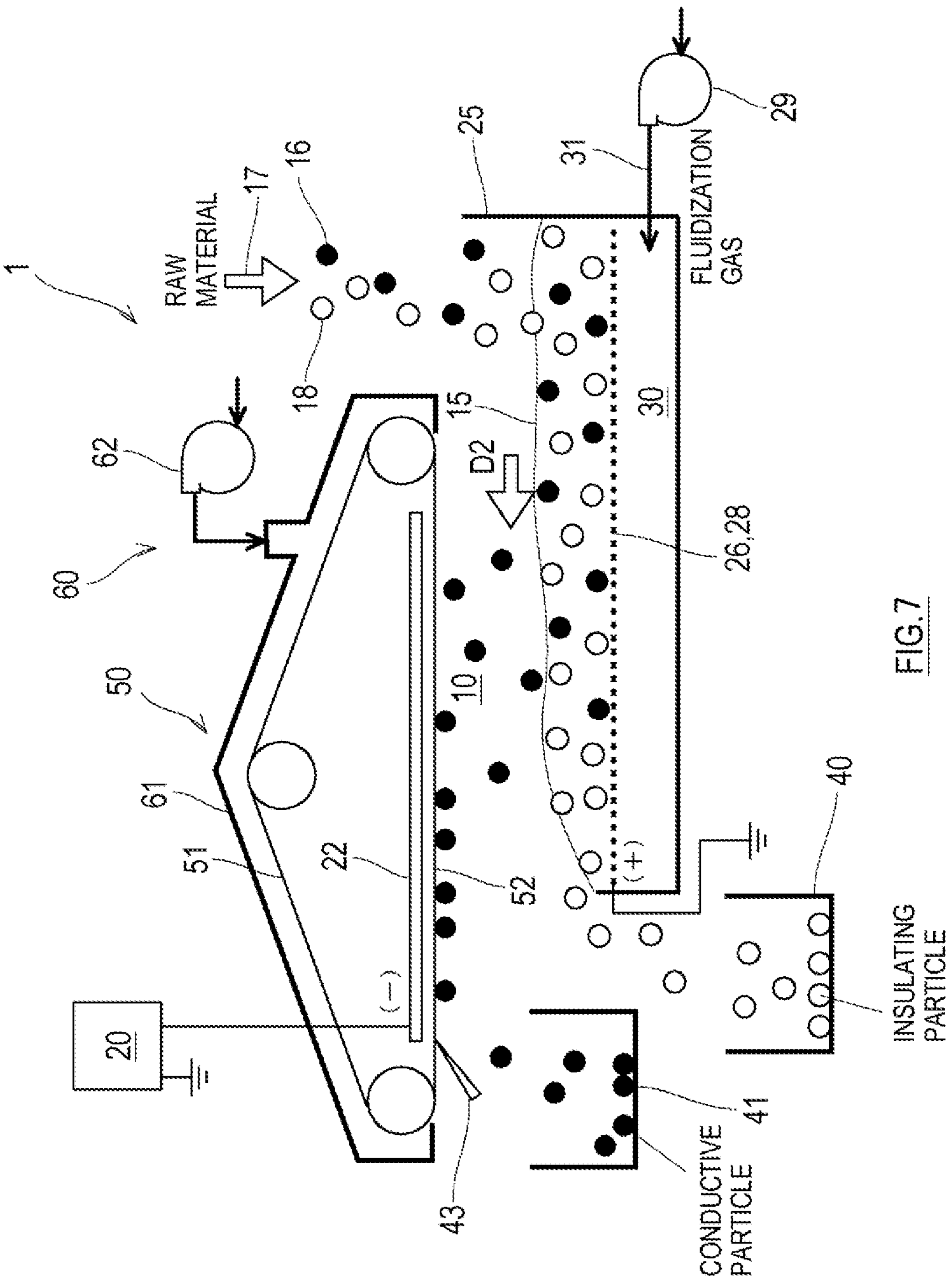
FIG. 7 is a diagram showing a modified example of the electrostatic separator including pressurizing equipment.

FIG. 7 is a diagram showing a modified example of the electrostatic separator 1 including the pressurizing equipment 60. As shown in FIG. 7, the conveyor equipment 50 includes the pressurizing equipment 60. The pressurizing equipment 60 includes a hood 61 and a pressurizer 62 that pressurizes the inside of the hood 61. The hood 61 covers the entire conveyor belt 51 of the conveyor equipment 50 except for the conveyance surface 52 that faces downward. The pressurizer 62 pressurizes the hood 61 such that the pressure in the hood 61 becomes positive pressure relative to the outside. The pressurizer 62 may be, for example, a blower that supplies compressed air to the inside of the hood 61. The pressurizer 62 supplies the compressed air to the inside of the hood 61 such that the pressure in the hood 61 becomes predetermined pressure that is slightly positive pressure relative to the outside. The pressurizing equipment 60 may include a pressure sensor that detects pressure in the hood 61, and pressurization by the pressurizer 62 may be controlled based on a detected value of the pressure sensor such that the pressure in the hood 61 becomes predetermined pressure. As above, since the conveyor equipment 50 includes the pressurizing equipment 60, the flying particles are prevented from flowing to the inside of the hood 61, i.e., the inside of the conveyor equipment 50.

Moreover, in the electrostatic separator 1 and the electrostatic separation method, a surface height of the raw material layer 15 changes in the upper-lower direction by a change in the amount of raw materials 17 supplied to the container 25. Herein, the surface height of the raw material layer 15 denotes a vertical position of the surface of the raw material layer 15 based on a predetermined reference height. When the surface height of the raw material layer 15 changes, a distance between the upper electrode 22 and the surface of the raw material layer 15 changes. When the distance between the upper electrode 22 and the surface of the raw material layer 15 becomes excessively small, a spark easily occurs between the upper electrode 22 and the surface of the raw material layer 15. Each time the spark occurs, voltage application is interrupted, and stable operation of the electrostatic separator 1 cannot be continued. Moreover, when a member at which the spark has occurred and the power supply 20 are damaged, the operation of the electrostatic separator 1 needs to be stopped for disassembly, inspection, or maintenance. In contrast, when the distance between the upper electrode 22 and the surface of the raw material layer 15 becomes excessively large, an ideal electrostatic separation action may not be realized.

Figure 8:
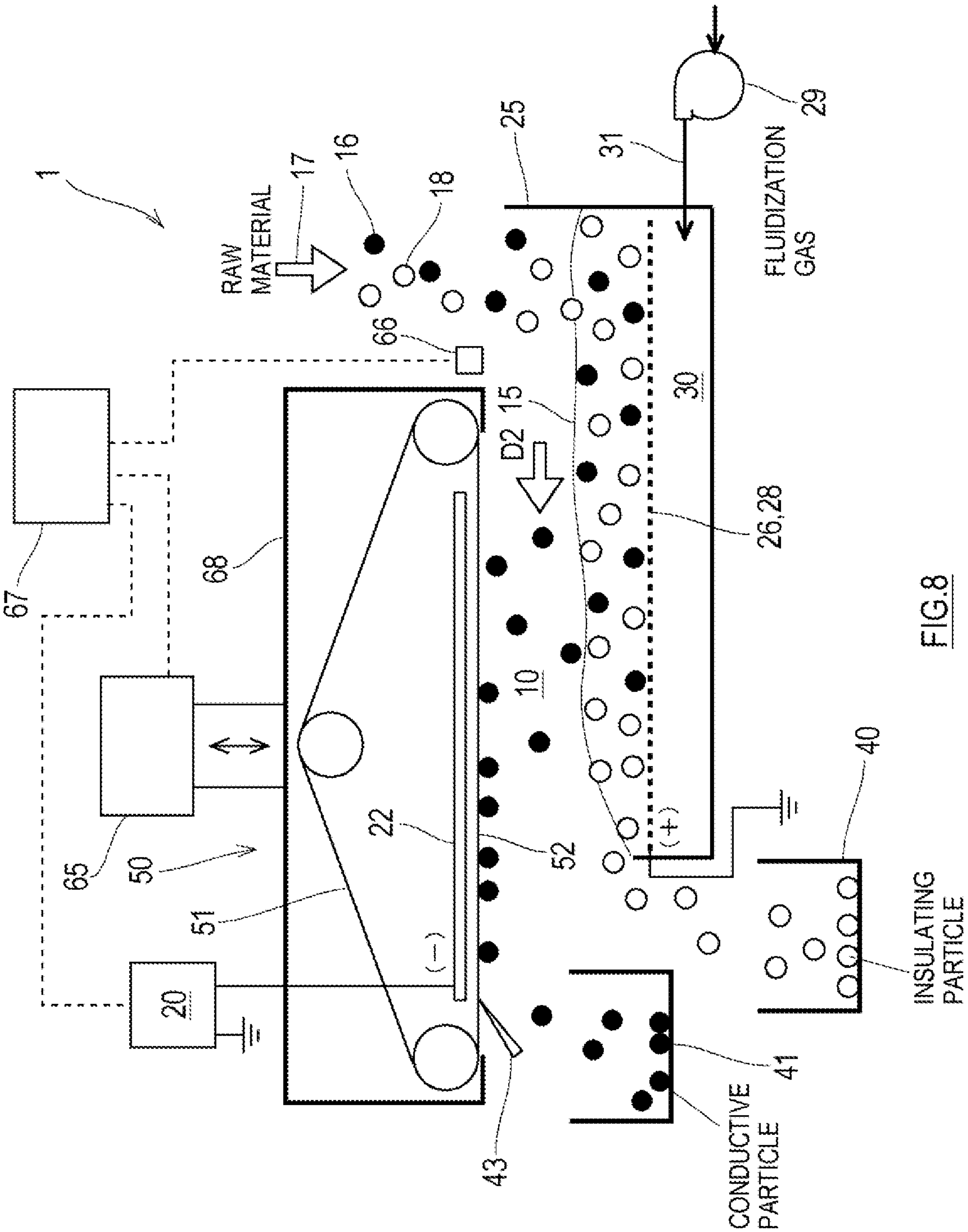
FIG. 8 is a diagram showing a modified example of the electrostatic separator including a lifter.

Therefore, as shown in FIG. 8, to appropriately keep the distance between the upper electrode 22 and the surface of the raw material layer 15, the electrostatic separator 1 may include a lifter 65 that can adjust the distance between the upper electrode 22 and the surface of the raw material layer 15. In the example shown in FIG. 8, the conveyor equipment 50 is housed in a casing 68, and the conveyor belt 51 and its support roller are supported by the casing 68. Moreover, the upper electrode 22 located above the downward-facing conveyance surface 52 of the conveyor belt 51 is also supported by the casing 68. The lifter 65 lifts or lowers the casing 68. The lifter 65 may be of a hydraulic type or an electric type. When the lifter 65 lifts or lowers the casing 68, the upper electrode 22 and the conveyance surface 52 are also lifted or lowered integrally with the casing 68. The operation of the lifter 65 is controlled by lift circuitry 67. The lift circuitry 67 may be a computer that includes a memory and a processor and operates in accordance with installed programs. The lift circuitry 67 controls the height of the upper electrode 22. Herein, the height of the upper electrode 22 denotes a vertical position of the upper electrode 22 based on the above-described reference height.

The electrostatic separator 1 may include a level sensor 66 that measures the surface height of the raw material layer 15 of the container 25. The surface height of the raw material layer 15 of the container 25 varies in the container 25. For example, the surface height of the raw material layer 15 may be measured at an entrance of the capture region 10. The level sensor 66 may be a contact sensor or a noncontact sensor. Or, the level sensor 66 may be a noncontact distance sensor that is attached to the casing 68 and detects the distance between the upper electrode 22 and the surface of the raw material layer 15. A detected value of the level sensor 66 is output to the lift circuitry 67. The lift circuitry 67 calculates the distance between the upper electrode 22 and the surface of the raw material layer 15 from the height of the upper electrode 22 and the surface height of the raw material layer 15. Or, the lift circuitry 67 may directly acquire the distance between the upper electrode 22 and the surface of the raw material layer 15 from the level sensor 66.

The lift circuitry 67 monitors the distance between the upper electrode 22 and the surface of the raw material layer 15 during the operation of the electrostatic separator 1. An appropriate numerical range (hereinafter referred to as a standard range) regarding the distance between the upper electrode 22 and the surface of the raw material layer 15 is preset in the lift circuitry 67. The standard range differs depending on the type of the raw materials 17, the strength of the electric field to be used, the specifications of the electrostatic separator 1, and the like.

When the distance between the upper electrode 22 and the surface of the raw material layer 15 becomes larger or smaller than the standard range during the operation of the electrostatic separator 1, the lift circuitry 67 operates the lifter 65 such that the distance between the upper electrode 22 and the surface of the raw material layer 15 becomes a standard value. The standard value of the distance between the upper electrode 22 and the surface of the raw material layer 15 is a value within the standard range and is preset in the lift circuitry 67.

Since the distance between the upper electrode 22 and the surface of the raw material layer 15 is adjusted as above, the distance between the upper electrode 22 and the lower electrode 28 changes, and the strength of the electric field also changes. Then, the lift circuitry 67 may operate the power supply 20 so as to adjust the potential difference between the upper electrode 22 and the lower electrode 28 in accordance with the height of the upper electrode 22 such that the strength of the electric field is maintained at a desired value. In this case, the lift circuitry 67 is electrically connected to the power supply 20 so as to be able to output an operation command to the power supply 20. For example, the power supply 20 which has acquired information regarding the height of the upper electrode 22 from the lift circuitry 67 applies a voltage between the upper electrode 22 and the lower electrode 28 such that: when the height of the upper electrode 22 becomes higher than an initial value, the potential difference between the upper electrode 22 and the lower electrode 28 becomes large; and when the height of the upper electrode 22 becomes lower than the initial value, the potential difference between the upper electrode 22 and the lower electrode 28 becomes small.

Conclusion of Present Embodiment

As described above, the electrostatic separator 1 according to the present embodiment separates the conductive particles 16 from the raw materials 17 including the conductive particles 16 and the non-charged insulating particles 18. The electrostatic separator 1 includes: the container 25 in which the raw material layer 15 including the raw materials 17 is located; the lower electrode 28 located at the bottom portion of the raw material layer 15 or in the raw material layer 15; the fluidization gas supplier 29 that supplies the fluidization gas 31 that is introduced from the bottom portion of the container 25 into the raw material layer 15 and flows upward in the raw material layer 15 through the lower electrode 28; the upper electrode 22 located above the raw material layer 15; the endless conveyor belt 51 that includes the conveyance surface 52 including a nonconductor and rotates such that the conveyance surface 52 facing downward passes through the capture region 10 that is located above the raw material layer 15 and under the upper electrode 22; and the power supply 20 that applies a voltage between the upper electrode 22 and the lower electrode 28 such that one of the upper electrode 22 and the lower electrode 28 becomes a negative electrode, the other becomes a positive electrode, and an electric field is generated between these electrodes. Then, in the electrostatic separator 1, by bringing the conductive particles 16 and the lower electrode 28 into contact with each other in the raw material layer 15, only the conductive particles 16 are charged to have polarity that is the same as polarity of the lower electrode 28. By dielectric polarization, polarity that is the same as polarity of the upper electrode 22 is generated on the downward-facing conveyance surface 52 of the conveyor belt 51 which passes through the capture region 10. The charged conductive particles 16 are selectively separated from the raw material layer 15 by electrostatic force and are made to adhere to the conveyance surface 52 of the conveyor belt 51. The conductive particles 16 are separated and collected from the conveyance surface 52 that has moved to an outside of the electric field.

Moreover, the electrostatic separation method according to the present embodiment is the electrostatic separation method that separates the conductive particles 16 from the raw materials including the conductive particles 16 and the non-charged insulating particles 18. The electrostatic separation method includes: applying a voltage between the lower electrode 28 located at the bottom portion of the raw material layer 15 including the raw materials 17 or in the raw material layer 15 and the upper electrode 22 located above the raw material layer 15, to generate the electric field between these electrodes; fluidizing the raw material layer 15 and bringing the conductive particles 16 and the lower electrode 28 into contact with each other in the raw material layer 15 to charge only the conductive particles 16 such that polarity of the conductive particles 16 becomes the same as polarity of the lower electrode 28; generating polarity, which is the same as polarity of the upper electrode 22, by dielectric polarization on the downward-facing conveyance surface 52 of the conveyor belt 51 which passes through the capture region 10 that is located above the raw material layer 15 and under the upper electrode 22, the downward-facing conveyance surface 52 including a nonconductor; selectively separating the charged conductive particles 16 from the surface of the raw material layer 15 by electrostatic force and making the conductive particles 16 adhere to the conveyance surface 52 of the conveyor belt 51; and separating and collecting the conductive particles 16 from the conveyance surface 52 that has moved to an outside of the electric field.

In the above electrostatic separator 1 and the above electrostatic separation method, the conductive particles 16 that have been charged by the contact with the lower electrode 28 in the raw material layer 15 to have the same polarity as the lower electrode 28 move to the surface layer of the raw material layer 15 by the flow of the raw material layer 15. The conveyance surface 52 of the conveyor belt 51 which has the opposite polarity to the charged conductive particles 16 exists above the raw material layer 15. The conductive particles 16 selectively fly out of the raw material layer 15 by the electrostatic force and adhere to the conveyance surface 52. On the other hand, the insulating particles 18 in the raw material layer 15 are not charged by the contact with the lower electrode 28. The conveyance surface 52 faces downward, and even when the insulating particles 18 that have flown out of the raw material layer 15 by the force of the flow try to adhere to the conveyance surface 52, the insulating particles 18 fall by their own weights. Therefore, most of the particles captured by the conveyance surface 52 of the conveyor belt 51 are the conductive particles 16. Thus, the conductive particles 16 captured by the downward-facing conveyance surface 52 of the conveyor belt 51 are conveyed to an outside of the electric field by the rotation of the conveyor belt 51 and are separated and collected from the conveyance surface 52 of the conveyor belt 51 at the outside of the electric field. Therefore, the insulating particles 18 are prevented from being mixed with the particulates including the collected conductive particles 16, and the purity of the particulates including the collected conductive particles 16 can be improved.

The above electrostatic separator 1 may further include the lifter 65 that lifts or lowers the upper electrode 22. With this, the distance between the upper electrode 22 and the surface of the raw material layer 15 can be appropriately adjusted.

Moreover, in the above electrostatic separator 1, the lifter 65 may lift or lower the conveyor belt 51 together with the upper electrode 22. With this, the downward-facing conveyance surface 52 of the conveyor belt 51 is lifted or lowered in accordance with the lifting or lowering of the upper electrode 22, and thus, the distance between the downward-facing conveyance surface 52 of the conveyor belt 51 and the surface of the raw material layer 15 can be appropriately adjusted.

Moreover, the above electrostatic separator 1 may further include the lift circuitry 67 that monitors the distance between the upper electrode 22 and the surface of the raw material layer 15 and operates the lifter 65 such that the distance between the upper electrode 22 and the surface of the raw material layer 15 falls within a predetermined reference range in which a spark does not occur. Herein, when the distance between the upper electrode 22 and the surface of the raw material layer 15 falls outside the reference range, the lift circuitry 67 may operate the lifter 65 such that the distance between the upper electrode 22 and the surface of the raw material layer 15 becomes a predetermined reference value within the reference range.

Similarly, the above electrostatic separation method may further include: monitoring the distance between the upper electrode 22 and the surface of the raw material layer 15; and lifting or lowering the upper electrode 22 such that the distance between the upper electrode 22 and the raw material layer 15 becomes a predetermined reference range in which a spark does not occur.

With this, the distance between the upper electrode 22 and the surface of the raw material layer 15 is automatically and appropriately adjusted.

Moreover, in the above electrostatic separator 1, the power supply 20 may adjust the voltage applied between the upper electrode 22 and the lower electrode 28 in accordance with the lifting or lowering of the upper electrode 22 such that the strength of the electric field is maintained. With this, even when the height position of the upper electrode 22 changes, the electric field is maintained to have appropriate strength.

Moreover, the above electrostatic separator 1 may further include: the hood 61 covering the conveyor belt 51 except for the conveyance surface 52 facing downward; and the pressurizer 62 that pressurizes the inside of the hood 61. With this, the particles flying in the capture region 10 can be prevented from flowing to and getting into the rear side of the downward-facing conveyance surface 52 of the conveyor belt 51.

Moreover, the above electrostatic separator 1 may further include the insulating particle separation promoter 53 (53A, 53B) that promotes the separation of the insulating particles 18 adhering to the conveyance surface 52 of the conveyor belt 51 or the conductive particles 16.

Similarly, the above electrostatic separation method may further include vibrating the conveyance surface 52 of the conveyor belt 51 to shake off the insulating particles 18 adhering to the conveyance surface 52 or the conductive particles 16.

It may be supposed that: the conductive particles 16 and the insulating particles 18 are attracted by the intermolecular force; the insulating particles 18 fly out of the raw material layer 15 together with the conductive particles 16; and the insulating particles 18 adhere to the conveyor belt 51 (or the conductive particles 16). In the electrostatic separator 1 and the electrostatic separation method according to the present embodiment, the insulating particles 18 adhering to the conveyor belt 51 as above fall from the conveyor belt 51 by the vibration of the conveyor belt 51. Then, the insulating particles 18 return to the raw material layer 15 or are collected in the insulating particle collecting container 40. Thus, the amount of insulating particles 18 mixed with the conductive particles 16 collected in the conductive particle collecting container 41 can be reduced. As a result, the purity of the conductive particles 16 collected in the conductive particle collecting container 41 can be increased.

Moreover, the above electrostatic separator 1 may further include the particle separation structure 43 that destaticizes the conductive particles 16 adhering to the conveyor belt 51 by the electrostatic force to separate the conductive particles 16 from the conveyor belt 51.

Similarly, the above electrostatic separation method may further include destaticizing the conductive particles 16 adhering to the conveyor belt 51 by the electrostatic force to separate and collect the conductive particles 16 from the conveyor belt 51.

With this, the conductive particles 16 adhering to the conveyor belt 51 can be easily separated from the conveyor belt 51. Moreover, by eliminating the charging of the conductive particles 16, a destaticizing treatment after the collection is unnecessary.

Moreover, in the electrostatic separator 1 according to the above embodiment, the movement direction D1 of the conveyance surface 52 in the capture region 10 by the rotation of the conveyor belt 51 and the flow direction D2 of the raw materials 17 in the container 25 may be orthogonal to each other in a plan view.

Similarly, in the electrostatic separation method according to the present embodiment, the movement direction D1 of the conveyance surface 52 in the capture region 10 by the rotation of the conveyor belt 51 and the flow direction D2 of the raw materials 17 in the raw material layer 15 may be orthogonal to each other in a plan view.

As above, when the movement direction D1 of the conveyance surface 52 in the capture region 10 and the flow direction D2 of the raw materials 17 are orthogonal to each other, the conductive particles 16 can be made to adhere to the conveyance surface 52 more efficiently than when the movement direction D1 and the flow direction D2 are parallel to each other.

The foregoing has described the preferred embodiment (and the preferred modified examples) of the present disclosure. Modifications of specific structures and/or functional details of the above embodiment may be included in the present disclosure as long as they are within the scope of the inventive concept. The above configuration may be modified as below, for example.

For example, in the above embodiment, the lower electrode 28 is the positive electrode, and the upper electrode 22 is the negative electrode. However, in accordance with the characteristics of the conductive particles 16, the lower electrode 28 may be the negative electrode, and the upper electrode 22 may be the positive electrode.

The invention claimed is:

1. An electrostatic separator that separates conductive particles from raw materials including the conductive particles and non-charged insulating particles, the electrostatic separator comprising:

- a container in which a raw material layer including the raw materials is located;
- a lower electrode at a bottom portion of the raw material layer or in the raw material layer;
- a fluidization gas supplier configured to supply a fluidization gas that is introduced from a bottom portion of the container into the raw material layer and flows upward in the raw material layer through the lower electrode;
- an upper electrode above the raw material layer;
- an endless conveyor belt that includes a conveyance surface including a nonconductor and is configured to rotate such that the conveyance surface facing downward passes through a capture region that is above the raw material layer and under the upper electrode;
- a power supply configured to apply a voltage between the upper electrode and the lower electrode such that one of the upper electrode and the lower electrode becomes a negative electrode, the other becomes a positive electrode, and an electric field is generated between these electrodes;
- a lifter configured to lift or lower the upper electrode; and
- lift circuitry configured to monitor a distance between the upper electrode and a surface of the raw material layer and operate the lifter such that the distance between the upper electrode and the surface of the raw material layer falls within a predetermined reference range in which a spark does not occur, wherein:
- by bringing the conductive particles and the lower electrode into contact with each other in the raw material layer, only the conductive particles are charged to have polarity that is the same as polarity of the lower electrode;
- by dielectric polarization, polarity that is the same as polarity of the upper electrode is generated on the downward-facing conveyance surface of the conveyor belt which passes through the capture region;
- the charged conductive particles are selectively separated from the raw material layer by electrostatic force and are made to adhere to the conveyance surface of the conveyor belt; and
- the conductive particles are separated and collected from the conveyance surface that has moved to an outside of the electric field.

2. The electrostatic separator according to claim 1, wherein the lifter is configured to lift or lower the conveyor belt together with the upper electrode.

3. The electrostatic separator according to claim 1, wherein when the distance between the upper electrode and the surface of the raw material layer falls outside the reference range, the lift circuitry is configured to operate the lifter such that the distance between the upper electrode and the surface of the raw material layer becomes a predetermined reference value within the reference range.

4. The electrostatic separator according to claim 1, wherein the power supply is configured to adjust the voltage applied between the upper electrode and the lower electrode in accordance with the lifting or lowering of the upper electrode such that strength of the electric field is maintained.

5. The electrostatic separator according to claim 1, further comprising:

- a hood covering the conveyor belt except for the conveyance surface facing downward; and
- a pressurizer configured to pressurize an inside of the hood.

6. The electrostatic separator according to claim 1, further comprising an insulating particle separation promoter configured to promote separation of the insulating particles adhering to the conveyance surface of the conveyor belt or the conductive particles.

7. The electrostatic separator according to claim 1, further comprising a particle separation structure configured to destaticize the conductive particles adhering to the conveyor belt by the electrostatic force to separate the conductive particles from the conveyor belt.

8. The electrostatic separator according to claim 1, wherein a movement direction of the conveyance surface in the capture region by rotation of the conveyor belt and a flow direction of the raw materials in the container are orthogonal to each other in a plan view.

9. An electrostatic separation method that separates conductive particles from raw materials including the conductive particles and non-charged insulating particles, the electrostatic separation method comprising:

- applying a voltage between a lower electrode located at a bottom portion of a raw material layer including the raw materials or in the raw material layer and an upper electrode located above the raw material layer, to generate an electric field between these electrodes;
- fluidizing the raw material layer and bringing the conductive particles and the lower electrode into contact with each other in the raw material layer to charge only the conductive particles such that polarity of the conductive particles becomes the same as polarity of the lower electrode;
- generating polarity, which is the same as polarity of the upper electrode, by dielectric polarization on a downward-facing conveyance surface of a conveyor belt which passes through a capture region that is located above the raw material layer and under the upper electrode, the downward-facing conveyance surface including a nonconductor;
- monitoring a distance between the upper electrode and the surface of the raw material layer and lifting or lowering the upper electrode such that the distance between the upper electrode and the surface of the raw material layer falls within a predetermined reference range in which a spark does not occur
- selectively separating the charged conductive particles from a surface of the raw material layer by electrostatic force and making the conductive particles adhere to the conveyance surface of the conveyor belt; and separating and collecting the conductive particles from the conveyance surface that has moved to an outside of the electric field.

10. The electrostatic separation method according to claim 9, further comprising vibrating the conveyance surface of the conveyor belt to shake off the insulating particles adhering to the conveyance surface or the conductive particles.

11. The electrostatic separation method according to claim 9, further comprising destaticizing the conductive particles adhering to the conveyor belt by the electrostatic force to separate and collect the conductive particles from the conveyor belt.

12. The electrostatic separation method according to claim 9, wherein a movement direction of the conveyance surface in the capture region by rotation of the conveyor belt and a flow direction of the raw materials in the raw material layer are orthogonal to each other in a plan view.

* * * * *